(12) United States Patent
Heuzebroc et al.

(10) Patent No.: US 10,259,145 B2
(45) Date of Patent: Apr. 16, 2019

(54) HEATING MODULE COMPRISING A LAMP AND A LENS FASTENED BY A BRACE TO A NON-EMISSIVE PORTION OF THE LAMP

(71) Applicant: SIDEL PARTICIPATIONS, Octeville-sur-Mer (FR)

(72) Inventors: Pierre Heuzebroc, Octeville-sur-Mer (FR); Stephane Morin, Octeville-sur-Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 142 days.

(21) Appl. No.: 14/902,710

(22) PCT Filed: Jul. 1, 2014

(86) PCT No.: PCT/EP2014/063913
§ 371 (c)(1),
(2) Date: Jan. 4, 2016

(87) PCT Pub. No.: WO2015/000875
PCT Pub. Date: Jan. 8, 2015

(65) Prior Publication Data
US 2016/0167258 A1    Jun. 16, 2016

(30) Foreign Application Priority Data
Jul. 4, 2013 (FR) ..................................... 13 56538

(51) Int. Cl.
*F21V 7/00* (2006.01)
*F26B 3/28* (2006.01)
(Continued)

(52) U.S. Cl.
CPC ...... *B29C 35/0805* (2013.01); *B29C 49/6409* (2013.01); *B29C 49/6445* (2013.01);
(Continued)

(58) Field of Classification Search
None
See application file for complete search history.

(56) References Cited

U.S. PATENT DOCUMENTS 2,864,025 A * 12/1958 Foote ...................... H01K 1/20
313/274
3,179,789 A * 4/1965 Gialanella ............... F24C 7/065
338/237
(Continued)

FOREIGN PATENT DOCUMENTS

EP    0 820 376 B1    9/2002
EP    1 366 886 A1    12/2003
(Continued)

OTHER PUBLICATIONS

International Search Report, dated Sep. 10, 2014, from corresponding PCT Application.

*Primary Examiner* — Thor S Campbell
(74) *Attorney, Agent, or Firm* — Young & Thompson

(57) ABSTRACT

A module (10) for heating a preform (12) made of a thermoplastic, includes: a lamp (16) having an emissive portion (22) emitting heating electromagnetic radiation and a non-emissive portion (24) that does not emit the heating radiation; and a longitudinal lens (32) that is fastened to the lamp (16), by at least one fastening brace (34), parallel to the emitting portion (22) in order to focus the heating radiation toward a selected zone of the preform; wherein each brace (34) is only fastened to the non-emissive portion (24) of the lamp (16).

13 Claims, 7 Drawing Sheets

(51) Int. Cl.
*B29C 35/08* (2006.01)
*B29C 49/64* (2006.01)
*B29C 49/68* (2006.01)
*B29C 49/06* (2006.01)

(52) U.S. Cl.
CPC ............. *B29C 49/68* (2013.01); *F26B 3/28* (2013.01); *B29C 49/06* (2013.01); *B29C 2035/0822* (2013.01)

(56) References Cited

U.S. PATENT DOCUMENTS

| | | | | |
|---|---|---|---|---|
| 3,427,435 A | * | 2/1969 | Eckles | A21B 2/00 219/411 |
| 3,862,397 A | * | 1/1975 | Anderson | C23C 16/481 118/724 |
| 4,493,960 A | * | 1/1985 | Mittelsteadt | H05B 3/44 219/405 |
| 4,556,786 A | * | 12/1985 | Frost | H05B 3/06 219/459.1 |
| 4,728,777 A | * | 3/1988 | Tsisios | F24C 7/06 219/405 |
| 5,157,758 A | * | 10/1992 | Halberstadt | H01K 1/28 219/553 |
| 5,387,800 A | * | 2/1995 | Kurtich | F21V 19/008 250/493.1 |
| 5,757,112 A | * | 5/1998 | Van Dulmen | F26B 3/28 313/113 |
| 5,920,677 A | | 7/1999 | Emmer et al. | |
| 5,951,896 A | * | 9/1999 | Mahawili | C30B 25/10 219/405 |
| 5,994,681 A | * | 11/1999 | Lloyd | F03G 6/04 219/628 |
| 6,093,919 A | * | 7/2000 | Seo | F21V 19/0075 126/21 A |
| 6,399,955 B1 | * | 6/2002 | Fannon | H01K 1/24 250/424 |
| 7,212,735 B2 | * | 5/2007 | Konishi | F26B 3/30 392/407 |
| 7,565,067 B2 | * | 7/2009 | Rodway | H02G 1/128 219/411 |
| 7,595,464 B2 | * | 9/2009 | Konishi | F24C 7/065 219/216 |
| 8,133,088 B2 | * | 3/2012 | Kim | C09D 183/04 313/315 |
| 8,278,805 B2 | * | 10/2012 | Monteix | H05B 3/0038 313/113 |
| 8,704,137 B2 | * | 4/2014 | Hsu | B23K 1/0016 219/148 |
| 2009/0116824 A1 | * | 5/2009 | Suzuki | H01L 21/67115 392/411 |
| 2010/0054719 A1 | * | 3/2010 | Mizukawa | H01K 1/38 392/411 |

FOREIGN PATENT DOCUMENTS

JP  2008-198571 A  8/2008
WO  2011/039667 A1  4/2011

\* cited by examiner

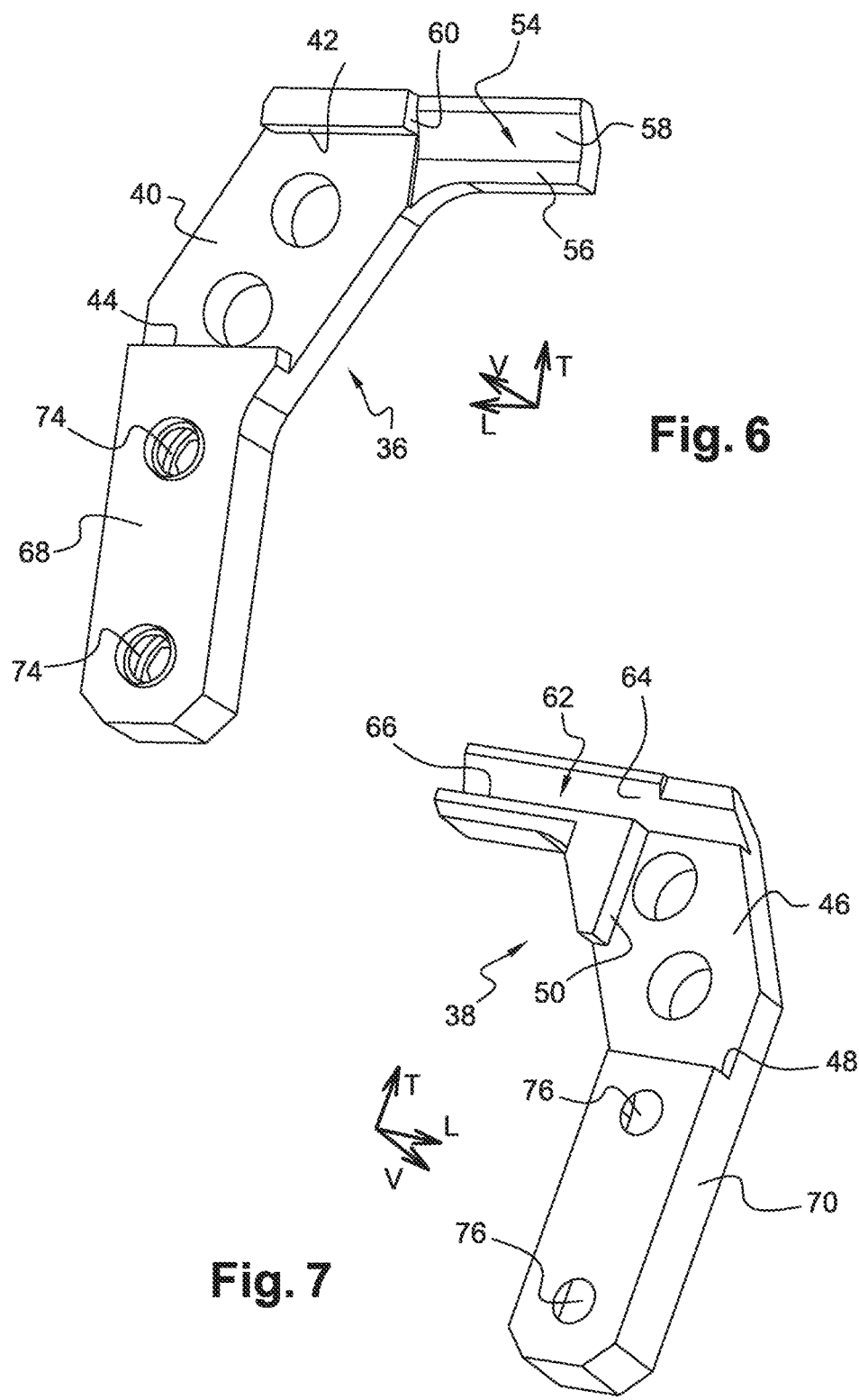

HEATING MODULE COMPRISING A LAMP AND A LENS FASTENED BY A BRACE TO A NON-EMISSIVE PORTION OF THE LAMP

The invention relates to a heating module for a preform of thermoplastic material.

The invention relates more particularly to a heating module for a preform of thermoplastic material, which comprises:

- at least one lamp comprising a tubular bulb with a longitudinal axis, the bulb being sealed at both its longitudinal ends by two crimped parts, the lamp comprising two end caps each fastened to one of the crimped parts, the tubular section of the bulb forming an emissive portion of a heating electromagnetic radiation, while the crimped parts and the end caps form a non-emissive portion that does not emit said heating radiation;
- at least one longitudinal lens that is fastened to the lamp, by means of at least one fastening bracket, parallel to the emissive portion to focus the heating radiation toward a selected area of the preform.

BACKGROUND OF THE INVENTION

Manufacturing containers of thermoplastic material by forming preforms, for example by blow molding or by stretch blow molding, is known. To perform the forming operation, it is necessary to heat the body of the preforms beforehand to a glass transition temperature so as to render it malleable. The installations for mass production of containers have for this purpose stations for heating preforms.

A blow molding station generally has the shape of a tunnel in which at least one of the walls is formed by an assembly of several heating modules such as the one described above. The preforms advance along the tunnel in front of the heating modules while rotating around themselves so that their body is uniformly heated to a temperature that is suitable for the forming operation.

The lamps used for the heating of the preforms are generally halogen-type lamps that emit a heating electromagnetic radiation, for example an infrared radiation. They comprise a tubular portion of the bulb that contains a filament that extends longitudinally between two end caps. Each end cap makes possible the supplying of electricity to the filament. When it is supplied with the adequate electrical power, the filament emits the heating radiation radially in all directions.

Furthermore, for the forming of certain container types of thermoplastic material, it is preferable to heat certain areas of the preform to very precise temperatures. To make it possible to heat selectively certain areas of the preform, it is known to insert an optical lens on the path of the beam. Such a solution is described in greater detail in the document EP-B1-0,820,376. The lens makes it possible to focus the heating radiation in a precise area of the preform and thus to avoid the heating of certain areas of the preform such as the neck.

The lens is generally fastened to the tubular portion of the bulb by means of fastening brackets. For example, they are collars that are tightened around the emissive portion of the lamp.

Nevertheless, the fastening brackets then make a shadow by preventing a portion of the heating radiation from reaching the preforms.

To improve the efficiency of these lamps, it is known to arrange reflecting means to redirect the radiation toward the preform. To do this, it is known to arrange a reflector behind the lamp. Such a design is, for example, described in the document WO-A1-2011/039667.

However, in this configuration, the space reserved between the reflector and the tubular portion of the bulb is insufficient to admit the fastening brackets of the lens.

SUMMARY OF THE INVENTION

The invention proposes a heating module of the type described above, characterized in that the fastening of each bracket onto the lamp is performed only on the non-emissive portion of the lamp.

According to other characteristics of the invention:

- the heating module has at least one reflector that is arranged at a distance from the emissive portion of the lamp, opposite the lens;
- the bracket is fastened by clamping on the non-emissive portion of the lamp;
- the fastening bracket is fastened by elastic fitting of complementary shapes on the non-emissive portion of the lamp;
- at least one fastening bracket is fastened onto one of the end caps;
- the bracket is fastened by longitudinal fitting of a slot of the bracket onto a free longitudinal end of complementary shape of the end cap;
- the fastening bracket has two jaws that grip the end cap of the lamp to fasten the bracket by clamping on the lamp;
- the two jaws define at their interface a housing to hold a free longitudinal end of the lens;
- at least one jaw has a longitudinal stop face against a face associated with the end cap to position the bracket longitudinally onto the lamp;
- the jaws are fastened together by screwing;
- at least one fastening bracket is fastened onto one of the crimped parts of the lamp;
- the fastening bracket has a slot provided with a constriction that is fitted elastically onto the crimped part that is associated with the lamp;
- each fastening bracket is made of a heat-conducting material to perform the function of radiator for the non-emissive portions.

BRIEF DESCRIPTION OF THE DRAWINGS

Other characteristics and advantages of the invention will be brought out upon reading the following detailed description, for the understanding of which reference will be made to the accompanying drawings of which:

FIG. 6 is a view in perspective that depicts an upper face of the lower jaw of the bracket of FIG. 4;

FIG. 7 is a view in perspective that depicts a lower face of the upper jaw of the bracket of FIG. 4;

In the description below, elements having an identical structure or similar functions will be designated by the same references.

DETAILED DESCRIPTION OF THE PREFERRED EMBODIMENTS

In the description below, longitudinal, vertical and transverse orientations, indicated by the trihedron "L, V, T" of the figures, will be adopted in a nonlimiting way. The vertical orientation "V" is a geometric reference that does not necessarily correspond to the orientation of gravity. The longitudinal orientation "L" is parallel to the main axis "A" of the tubular bulb of the heating lamp. The transverse direction "T" is directed from back to front from the lamp 16 to the preform 12.

Figure 1:
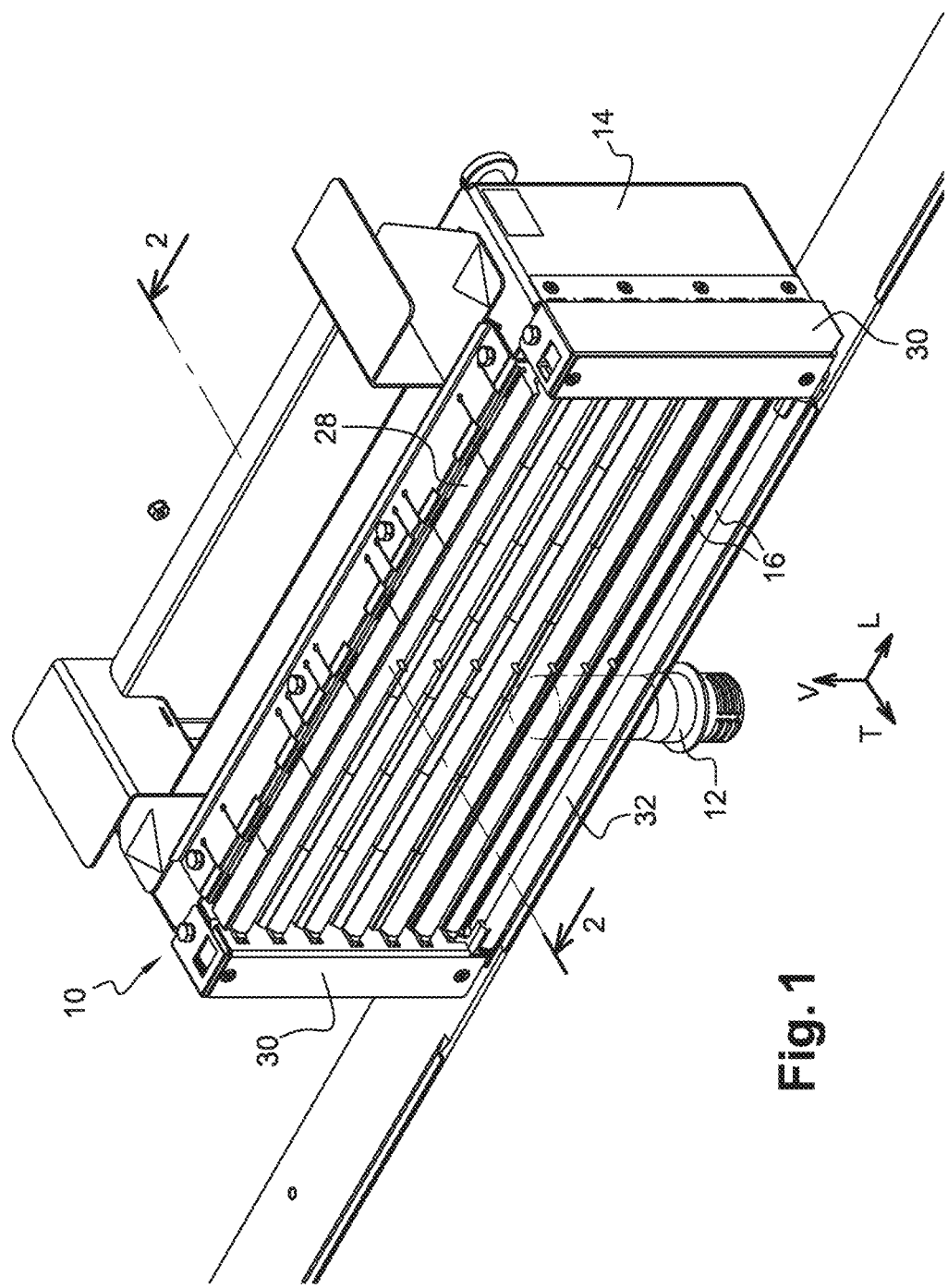
FIG. 1 is a view in perspective that depicts a heating module in which a focusing lens is fastened to the lamp arranged at the lower end of the module.
Figure 2:
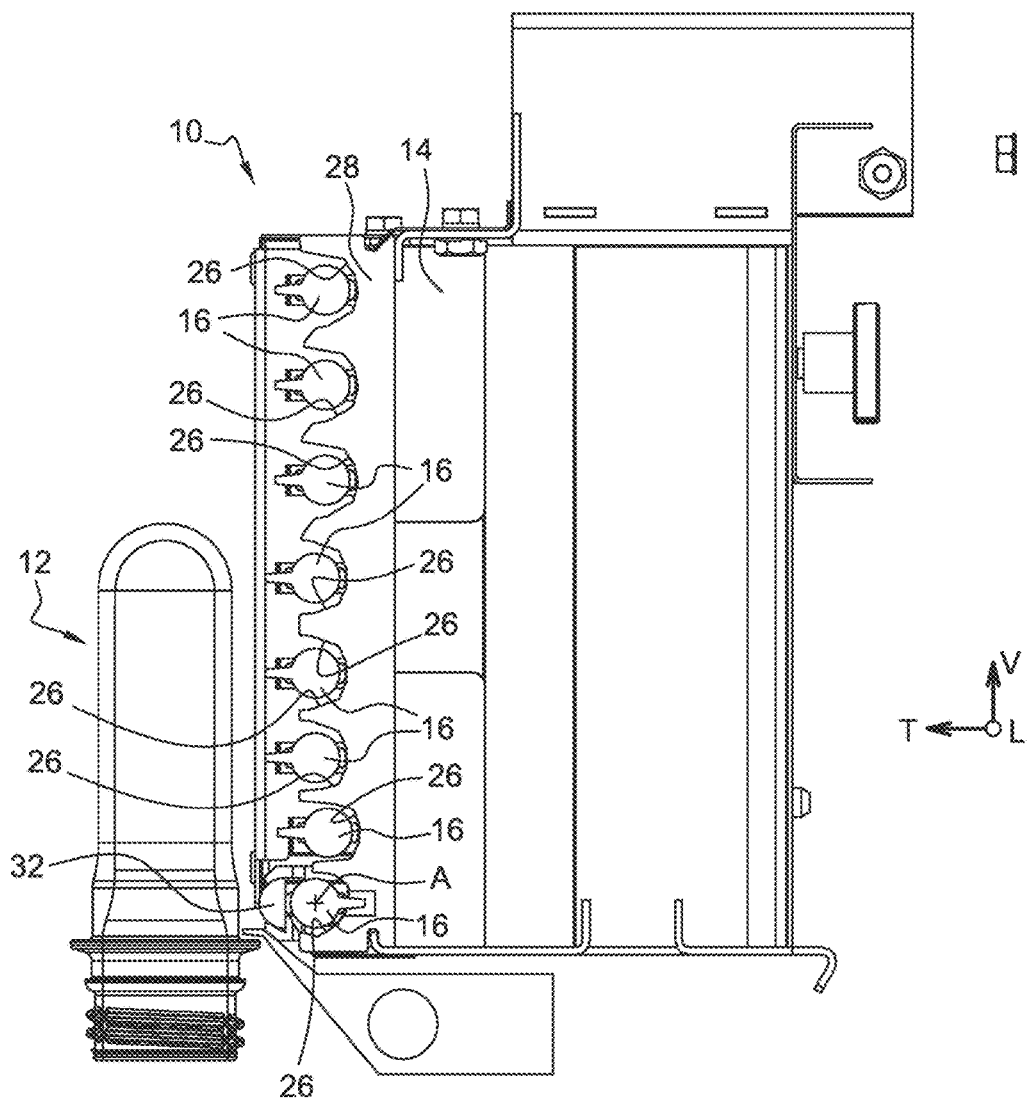
FIG. 2 is a view in cross-section along the cutting plane 2-2 of FIG. 1.

Depicted in FIGS. 1 and 2 is a heating module 10 for preforms 12 of thermoplastic material, one of which is depicted in the figures. The preforms 12 are carried by a conveying device (not shown) that causes them to advance and to rotate in a longitudinal direction.

The heating module 10 has a stationary support 14 that carries a plurality of heating lamps 16 that are identical.

Figure 3:
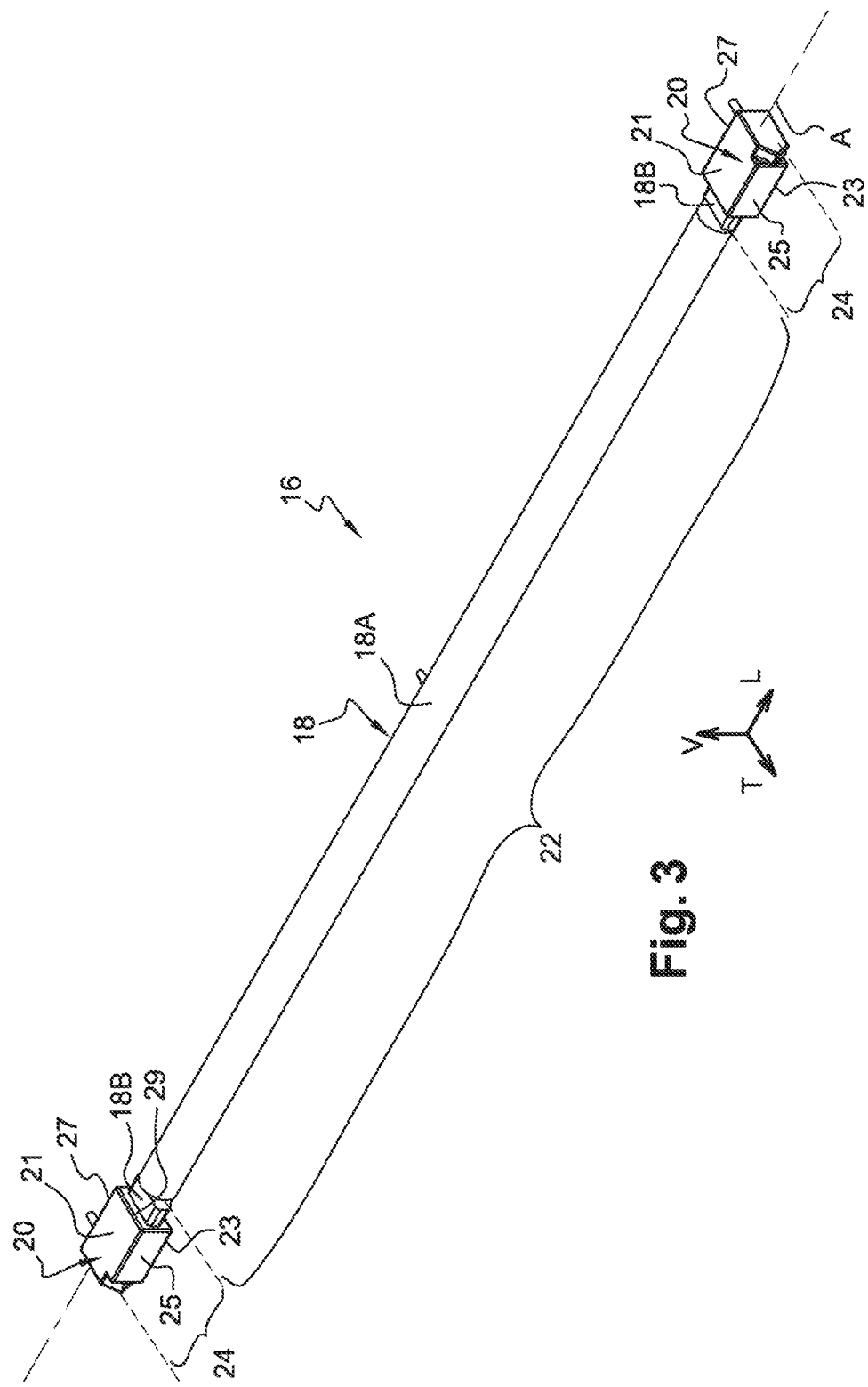
FIG. 3 is a view in perspective that depicts the lamp from the lower end of the heating module of FIG. 1.

As depicted in FIG. 3, each lamp 16 has a tubular bulb 18 with a longitudinal axis "A." The bulb 18 has a hollow tubular central section 18A that is hermetically sealed at both its longitudinal ends by two crimped parts 18B. The two crimped parts 18B are flattened in a transverse longitudinal plane.

The hollow tubular section 18A contains means (not shown) for emission of an electromagnetic radiation that is able to heat the thermoplastic material constituting the preform 12, for example an infrared radiation. For example, it involves a longitudinal filament that extends between the two crimped parts 18B and that lies in an atmosphere suitable for the emission of the heating radiation. With regard to a halogen-type lamp, the atmosphere contains a halogen gas.

The bulb 18 is made of a material that is transparent and heat-resistant, for example of quartz glass.

The lamp 16 also has two end caps 20, each of which is fastened to an associated crimped part 18B. Each end cap 20 has a parallelepiped casing that has an upper horizontal face 21, a lower horizontal face 23, a front longitudinal vertical face 25, a back longitudinal vertical face 27. Each end cap 20 also has a transverse vertical face 29, termed inner lateral face 29, which is turned toward the bulb 18 and which has an admitting opening for the free end of the associated crimped part 18B. Each end cap 20 also has a transverse vertical face 31, termed outer lateral face 31, which is opposite the lateral face 29.

Each end cap 20 contains means (not shown) for controlling the supply of electricity to the filament.

The tubular section 18A of the bulb 18 and its contents will be designated as "emissive portion 22" of the lamp 16 because they are able to emit the heating radiation radially in all directions when they are supplied with electric current.

In contrast, the crimped parts 18B and the end caps 20 form a "non-emissive portion 24" because they do not emit said electromagnetic radiation that can heat the preform 12.

Referring again to FIGS. 1 and 2, each lamp 16 is fastened in a removable way to the support 14 by means of their end caps 20. For this purpose, the support 14 has connecting means (not shown), mechanical and electrical, which receive the end caps 20.

The lamps 16 are fastened here relative to the support 14, i.e., it is not possible to adjust their transverse position relative to the stationary support 14.

The lamps 16 are distributed vertically above one another to form a vertical heating wall along the path of the preform 12.

As can be seen particularly in FIG. 2, the heating module 10 also has reflectors 26, each of which is associated with a lamp 16. Each reflector 26 is arranged transversely at a distance in back of the emissive portion 22 of the lamp 16.

Each reflector 26 is designed to reflect the heating radiation toward the front, in the direction of the preform 12. For this purpose, each reflector 26 has an overall concave semi-cylindrical shape that is open toward the front in which the emissive portion 22 is housed.

All of the reflectors 26 of the module 10 are formed here in a common unit 28 arranged transversely in back of the lamps 16. This unit 28 is fastened here to the stationary support 14.

As a variant, the reflectors of the module are formed in several units, each unit having at least two reflectors. The units can thus be stacked vertically as a function of the number of lamps to be arranged in a module. Such an embodiment is particularly advantageous when the installation must be adapted to preforms of different heights. For example, for small preforms of 5 cm in height, the module will have only four lamps, whereas for preforms of 10 cm in height, the module will have eight lamps. According to this example, each unit is designed to have four reflectors.

Each reflector 26 has a longitudinal dimension that is approximately equal to the longitudinal dimension of the emissive portion 22 of the lamp 16. Consequently, the non-emissive portions 24 of the lamp are arranged longitudinally projecting on both sides of the unit 28.

The stationary support 14 has in addition means for cooling the end caps 20 of the lamps 16 by circulation of a heat-exchanging fluid in the area of the non-emissive portions 24 of the lamp 16. The heating radiation is actually liable to heat the end caps 20. Now, each end cap 20 has electronic elements that are vulnerable to heat. Therefore, as shown in FIG. 1, the support 14 has two vertical cooling pipes 30 in which the end caps 20 of the lamps 16 are arranged. The cooling pipes 30 are arranged longitudinally on both sides of the unit 28 of reflectors 26. A heat-exchanging fluid, such as cold air, supplies these cooling pipes 30 to enable the cooling of the end caps 20.

As can be seen in FIG. 2, a longitudinal lens 32 is fastened to the lower end lamp 16. The lens 32 is arranged transversely in front of and at a distance from the emissive portion 22 of the lamp 16 to focus the heating radiation toward a selected area of the preform 12. The lens 32 has a length here that is approximately equal to that of the emissive portion 22 of the lamp 16.

In the example shown in the figures, only one lamp 16 is equipped with a lens 32. It will nevertheless be understood that the invention is applicable to modules in which several lamps 16 are equipped with identical lenses.

Figure 4:
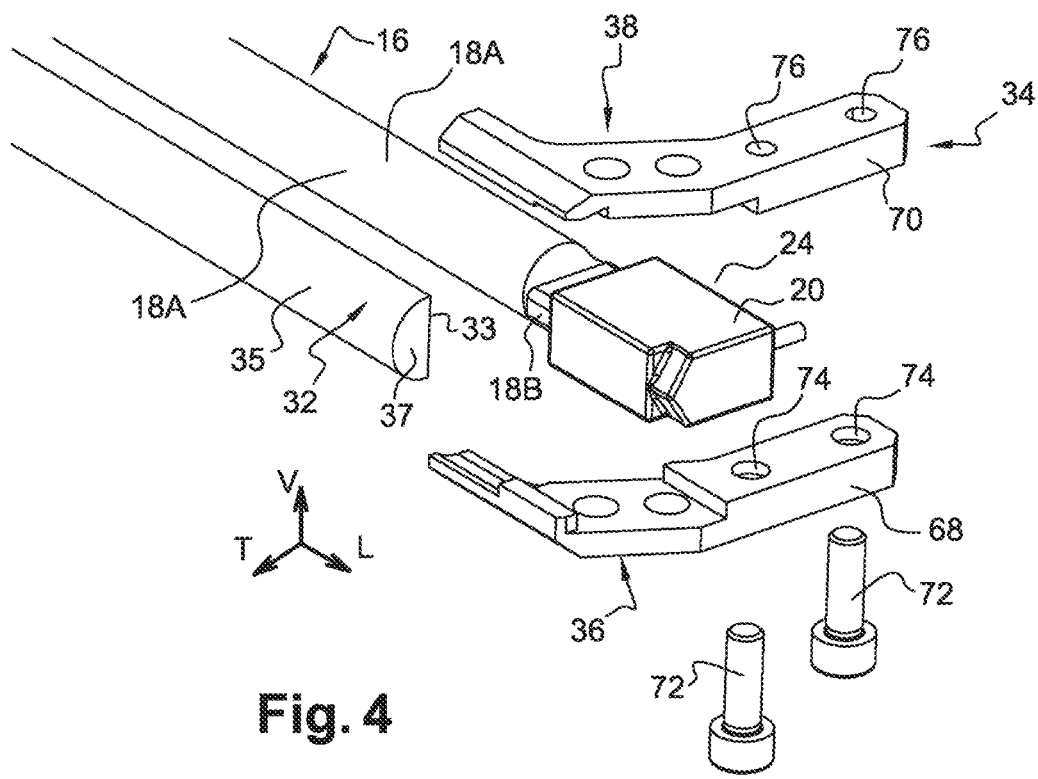
FIG. 4 is an exploded view in perspective that depicts the lens ready to be fastened to the lamp of FIG. 3 by means of a bracket made according to a first embodiment of the invention.

As shown in FIG. 4, the lens 32 has the shape of a cylindrical bar with a non-circular axial curve and with a longitudinal axis. The lens 32 has here a flat rear vertical face 33 and a curved front face 35. It is delimited longitudinally by two lateral end faces 37.

The lens 32 is made of a material that is transparent to the heating radiation, for example of quartz glass.

The lens 32 is fastened directly to the associated lamp 16 by means of at least one fastening bracket 34. The fastening bracket 34 advantageously makes possible a releasable fastening of the lens 32 to the lamp 16.

The fastening of each bracket 34 on the lamp 16 is performed only on a non-emissive portion 24 of the lamp 16. The emissive portion 22 of the lamp 16 thus remains totally free. This makes it possible to take advantage of the entire heating radiation to heat the preforms 12 while avoiding the creation of shadow areas.

The lens 32 is fastened to the lamp 16 by means of two brackets 34, each of which is arranged at a longitudinal end associated with the lamp 16.

The two brackets 34 have a structure and an arrangement that are identical by axial symmetry relative to a transverse axis. Below, only the bracket 34 arranged at the right end of the lamp 16 with reference to FIG. 1 will be shown and described. This description will be applicable in a symmetrical manner to the other bracket 34.

Shown in FIGS. 4 to 7 is the fastening bracket 34 made according to a first embodiment of the invention. In this first embodiment of the invention, the fastening bracket 34 is fastened onto the end cap 20 of the lamp 16.

The bracket 34 is fastened by clamping on the end cap 20. For this purpose, the fastening bracket 34 has a lower jaw 36 and an upper jaw 38. These two jaws 36, 38 are made here of two separate parts.

Figure 5:
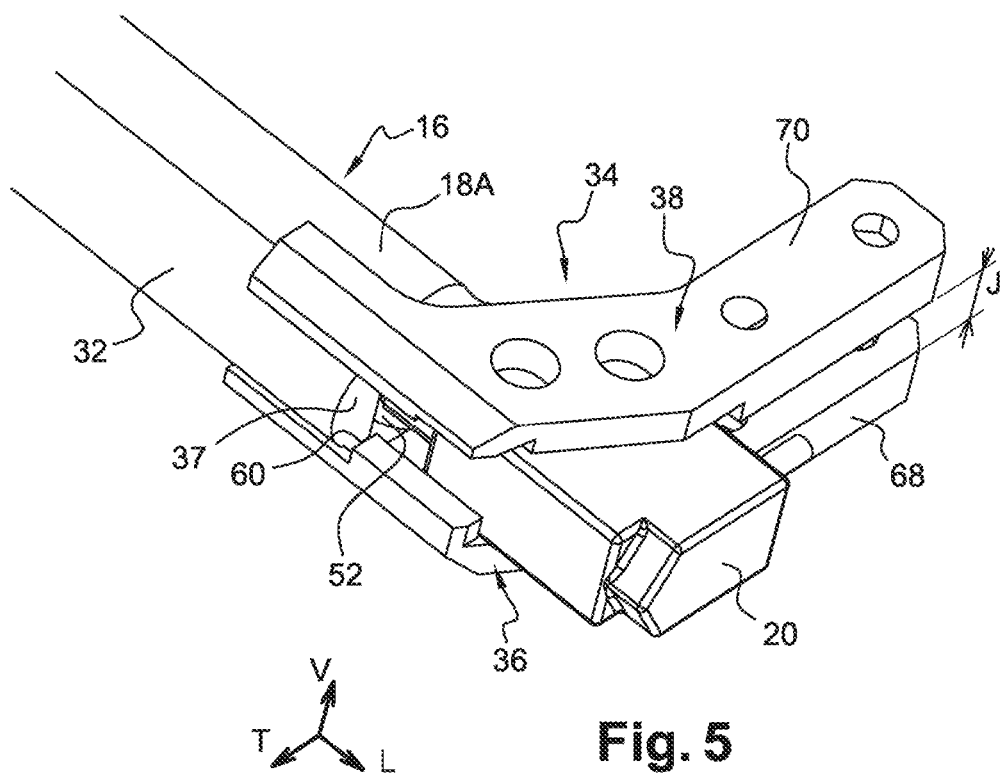
FIG. 5 is a view in perspective that is similar to that of FIG. 4 that depicts the lens mounted on the lamp.

The two jaws 36, 38 are fastened to one another so as vertically to grip the end cap 20 of the lamp 16 to fasten it by clamping the bracket 34 on the lamp 16, as is illustrated in FIG. 5.

The lower jaw 36 has been depicted in greater detail in FIG. 6. The lower jaw 36 has a first gripping face 40 that extends in a longitudinal transverse plane. This first gripping face 40 is turned toward the upper jaw 38. It is intended to come into contact with the flat lower face 23 of the end cap 20.

The gripping face 40 is delimited transversely by a front vertical face 42 and a rear vertical face 44 that are opposite and that are projecting relative to the gripping face 40. These two faces 42, 44 are intended to work with the front and rear faces 25, 27 of the end cap 20 to block in both directions the transverse movement of the lower jaw 36 relative to the lamp 16.

However, before its fastening with the upper jaw 38, the lower jaw 36 is liable to slide longitudinally relative to the end cap 20. This makes it possible to avoid a hyperstatic mounting of the bracket 34.

Now referring to FIG. 7, the upper jaw 38 also has a gripping face 46 that extends in a longitudinal transverse plane. This gripping face 46 is turned toward the gripping face 40 of the lower jaw 36. It is intended to come into contact with the flat upper face 21 of the end cap 20.

The gripping face 46 is delimited transversely toward the rear by a rear vertical face 48 that is projecting relative to the gripping face 46. This rear face 48 makes it possible to position the upper jaw 38 relative to the end cap 20 before its fastening with the lower jaw 36 by contact with the rear face 27 of the end cap 20.

By contrast, the upper jaw 38 is free to slide transversely toward the rear relative to the end cap 20. This makes it possible to avoid a hyperstatic mounting of the bracket 34.

The upper jaw 38 also has a transverse vertical face 50, termed longitudinal stop face 50, which is projecting relative to the gripping face 46. This longitudinal stop face 50 limits the gripping face 46 longitudinally toward the bulb 18. This longitudinal stop face 50 is intended to work with the inner lateral face 29 of the end cap 20 that is turned toward the bulb 18 for the longitudinal positioning of the upper jaw 38 relative to the lamp 16.

When they are brought together, the two jaws 36, 38 define at their interface a housing 52 for radially holding a free longitudinal end associated with the lens 32.

The housing 52 is offset longitudinally toward the bulb 18 relative to the gripping faces 40, 46. Thus, the housing 52 is open transversely in both directions to allow the passage of the heating radiation from the emissive portion 22 of the lamp 16 toward the preform 12.

As shown in FIG. 6, the lower jaw 36 has a lower half 54 of the housing 52 that extends longitudinally here from the portion of the lower jaw 36 that carries the gripping face 40. The lower half 54 of housing 52 extends in the direction of the bulb 18 of the lamp 16.

This lower half 54 of housing 52 has a lower bearing surface 56 that extends in a transverse longitudinal plane. The bearing surface 56 is bordered toward the front by a concave face 58 that is intended to block the sliding of the lens 32 transversely toward the front relative to the lower jaw 36 by conforming to the shape of the face 35 in front of the lens 32.

In contrast, the lens 32 is free to slide transversely toward the rear relative to the lower jaw 36.

The lower half 54 of housing 52 is further delimited longitudinally toward the gripping face 46 by a longitudinal vertical stop face 60. This longitudinal stop face 60 is intended to work with the associated end face 37 of the lens 32 to prevent the longitudinal sliding in a first direction of the lens 32 relative to the lamp 16.

The lower jaw of the bracket arranged at the other end of the lamp 16 has a longitudinal stop face that is similar but turned in the other direction to prevent the longitudinal sliding in a second direction of the lens 32 relative to the lamp 16. The longitudinal sliding of the lens 32 is thus blocked in both directions relative to the lamp 16.

Referring now to FIG. 7, the upper jaw 38 has an upper half 62 of the housing 52 that extends here longitudinally from the portion of the upper jaw 38 that carries the gripping face 46. The upper half 62 of housing 52 extends in the direction of the bulb 18 of the lamp 16.

This upper half 62 of housing 52 has a longitudinal gutter shape that is delimited transversely toward the front by a concave face 64 that extends longitudinally and that is intended to block the sliding of the lens 32 transversely toward the front relative to the lower jaw 36 by conforming to the shape of the front face 35 of the lens 32.

The upper half 62 of the housing 52 is also delimited transversely toward the rear by a longitudinal vertical face 66. This vertical face 66 is intended to work with the rear face 33 of the lens to block:

the transverse sliding toward the rear of the lens 32 relative to the lamp 16; and the rotation of the lens 32 around its longitudinal axis relative to the lamp 16.

In contrast, the lens 32 is free to slide longitudinally in both directions relative to the upper jaw 38.

To fasten the two jaws 36, 38 to one another and to make possible their tightening on the end cap 20, each bracket 34 has a shank 68, 70 that extends transversely toward the rear from their respective gripping face 40, 46.

The jaws 36, 38 are fastened together by screwing two vertical axis bolts 72. For this purpose, the shank 68 of the lower jaw 36 has two smooth through-holes 74 that are offset transversely relative to one another. The shank 70 of the upper jaw 38 has two threaded holes 76 that are arranged to coincide with the holes 74 of the lower jaw 36.

Furthermore, the two shanks 68, 70 have vertical dimensions that make it possible to tighten the gripping faces 40, 46 against the end cap 20 while keeping a vertical play "J" between the two shanks 68, 70, as illustrated in FIG. 5. Spacers (not shown), for example, are inserted vertically between the two shanks 68, 70.

In addition, the shanks 68, 70 extend into the cooling pipe 30.

The jaws 68, 70 of the bracket 34 are advantageously made of a material that is a sufficiently good conductor of heat to evacuate the heat from the end caps 20, for example of a metal material. Thus, the bracket 34 also performs the function of radiator for the end cap 20 of the lamp 16. The contact surface between the heat-exchanging fluid and the end cap 20 is thus increased, which has the effect of improving the cooling of the end cap 20.

Figure 8:
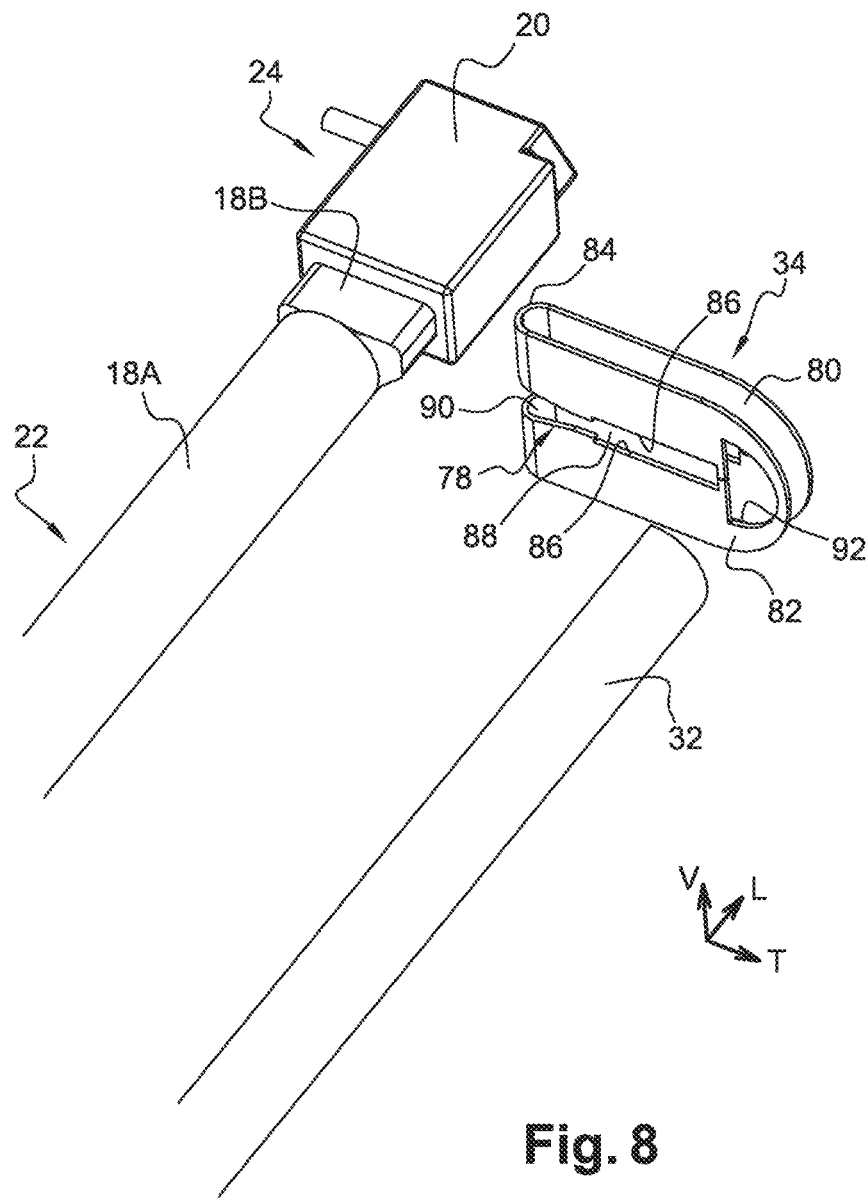
FIG. 8 is an exploded view in perspective that depicts the lens fastened to the lamp by means of a bracket made according to a second embodiment of the invention.

According to a second embodiment of the invention that is depicted in FIG. 8, the fastening bracket 34 is fastened to the lamp 16 by elastic fitting of a slot 78 with a shape complementary to that of the crimped part 18B.

Just like the first embodiment, the lens 32 is carried by two brackets 34 having a structure and an arrangement that are identical by mirror symmetry. Below, only one single bracket 34 will be shown and described, this description being in a symmetrical manner applicable to the other bracket 34.

As shown in FIG. 8, the bracket 34 is formed by punching and folding a metal sheet. The bracket 34 thus has two parallel vertical wings 80, 82 that are folded into a "U" shape that is open transversely toward the front. The wings 80, 82 are thus connected to one another by a rear transverse end bend 84 from which they extend transversely toward the front to a free end.

The slot 78 is made in a rear end portion of the bracket 34. The slot 78 extends transversely in each wing 80, 82 from a transversely intermediate portion of the bracket 34 to project toward the rear through the bend 84. The slot 78 is arranged vertically halfway up the bracket 34. The slot 78 is delimited vertically by two opposite transverse edges 86.

The slot 78 has a transverse dimension that is greater than that of the crimped part 18B. A front end section 88 of the slot 78 has a profile that is approximately identical to that of the vertical transverse section of the crimped part 18B. This front end section 88 is delimited transversely:

toward the front by a longitudinal stop front face forming the base of the slot 78; and toward the rear by a rear end section 90 that has a front end forming a vertical constriction relative to the front end section 88.

The rear end section 90 has a shape that flares from its front end to its rear end. The rear end has a vertical dimension that is greater than or equal to that of the crimped part 18B.

The wing 82 of the bracket 34 that is turned toward the other bracket 34 has an opening 92 that is made in front of the slot 78. This opening 92 has a profile with a shape that is complementary to that of the transverse vertical section of the lens 32.

During the mounting of the bracket 34, the end 37 of the lens 32 is inserted longitudinally into the opening 92 until coming into contact against the other wing 80.

Then, the bracket 34 is fitted transversely toward the rear onto the crimped part 18B. The sliding of the crimped part 18B in the flared rear end section 90 of the slot 78 causes the vertical separation of the two opposite edges 86 of the slot 78, making it possible for the crimped part 18B to go through the constriction up to the front end section 88 of the slot 78. When the crimped part 18B is entirely housed in the front end section 88, the opposite edges of the slot 78 are returned elastically into their original position, the constriction thus preventing the withdrawal of the bracket 34 relative to the crimped part 18B. Each bracket 34 is then fastened to the lamp 16.

The lens 32 is held radially relative to the brackets 34 by the edges of the opening 92. Also, the lens 32 is blocked longitudinally in both directions by the contact of its ends 37 with the wings 80 that are not provided with the opening 92.

The wing 80 that is not provided with the opening 92 is in longitudinal contact with the end cap 20, which makes it possible for the bracket 34 to perform the function of radiator, just as in the first embodiment.

In addition, since the bracket 34 is arranged in the immediate vicinity of the end cap 20, the heat-exchanging fluid also enters into contact with it, making possible its cooling.

Furthermore, since the bracket 34 is fastened onto the crimped part 18B, which belongs to the non-emissive portion of the lamp 16, no shadow area is created by the presence of the bracket 34.

Figure 9:
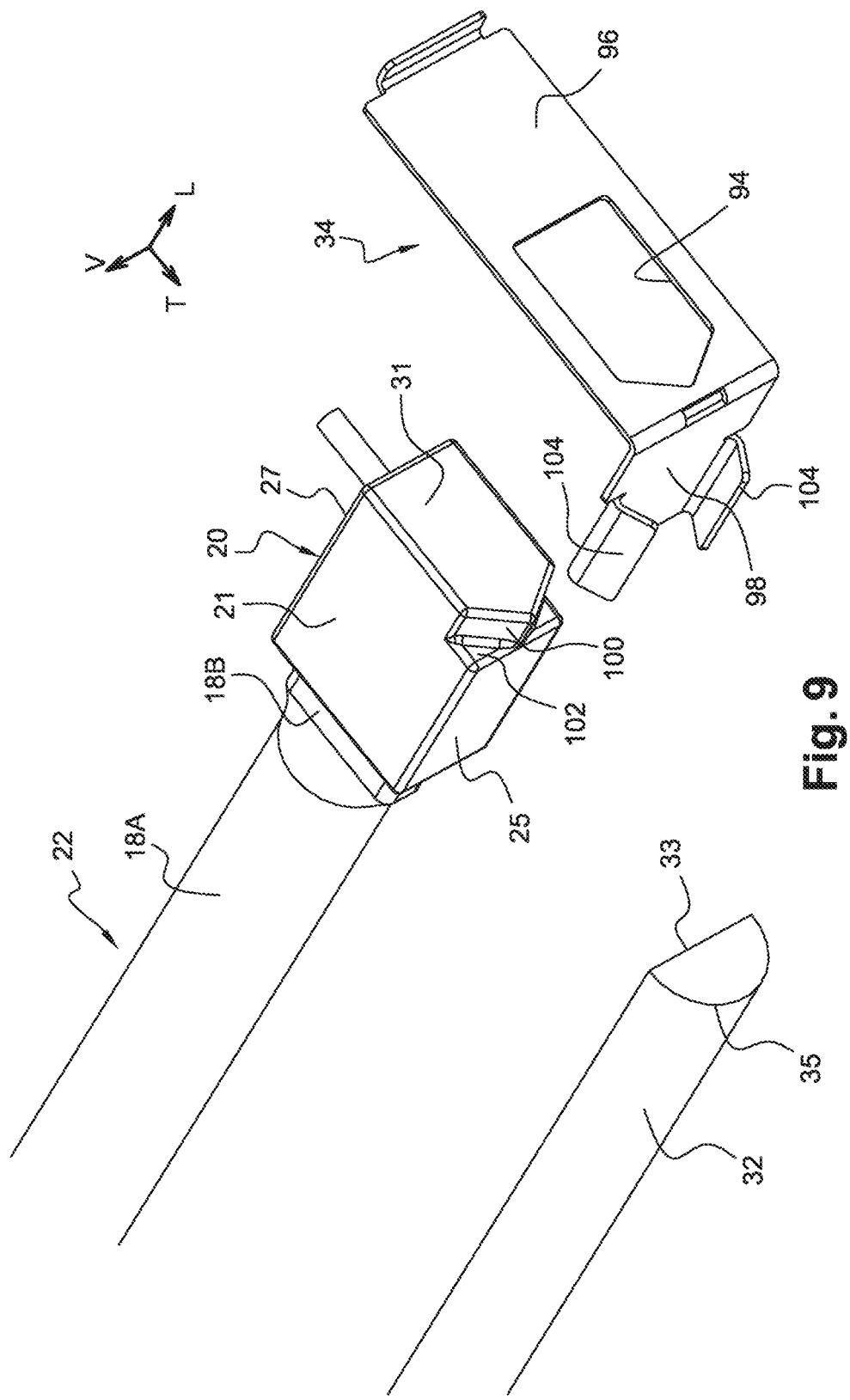
FIG. 9 is an exploded view in perspective that depicts the lens fastened to the lamp by means of a bracket made according to a third embodiment of the invention.

According to a third embodiment of the invention that is depicted in FIG. 9, the fastening bracket 34 is fastened onto the lamp 16 by longitudinal fitting of a window 94 with a shape that is complementary to that of a free longitudinal end of the end cap 20.

Just like the first embodiment, the lens 32 is carried by two brackets 34 that have a structure and an arrangement that are identical in a mirror-symmetrical manner. Below, only a single bracket 34 will be shown and described, this description being in a symmetrical manner applicable to the other bracket 34.

As shown in FIG. 9, the bracket 34 is formed by punching and folding a metal sheet. The bracket 34 has a square shape that has a first transverse vertical wing 96 and a second vertical wing 98 that extends longitudinally toward the other end of the lamp 22 from a front transverse end edge of the first wing 96.

The window 94 is made in the first longitudinal wing 96 of the bracket 34. It has a complementary shape with the free longitudinal end of the end cap 20. In the embodiment depicted in FIG. 9, the outer lateral face 31 of the end cap 20 has notches 100. The end cap 20 thus has a free longitudinal end section that has a transverse profile that is different from the rest of the end cap. The free end section thus has the same rectangular transverse profile as the rest of the end cap 20, with the difference that two apexes are beveled to form the notches.

The window 94 thus has this beveled rectangle shape, such that when the bracket 34 is fitted longitudinally on the free end section of the end cap 20, it abuts longitudinally against shoulder faces 102 that longitudinally delimit the notches 100.

The first wing 96 thus makes possible the fastening of the bracket 34 onto the end cap 20 by longitudinal fitting.

The second wing 98 of the bracket 34 has means for supporting the lens 32. These support means are formed by two projections 104. One projection 104 extends transversely toward the front from a lower edge of the wing 98, while the other projection 104 extends transversely toward the front from an upper edge of the wing 98. The two projections 98 are folded over toward one another in the manner of a hook so as to form a housing able to accommodate the lens 32 by longitudinal sliding.

During assembly, the bracket 34 is first of all mounted by axial fitting of its first wing 96 on the free end section of the end cap 20. The second wing 98 then extends against the front face 25 of the end cap 20.

To make possible a sufficient holding of the bracket 34 on the end cap 20, the window 94 is, for example, fitted with a snug fit on the free end of the end cap 20.

Then, the lens 32 is inserted by longitudinal sliding between the projections 104 of the second wing 98. Thus, the flat rear face 33 of the lens 32 is in flat contact with a front face of the wing 98, while the projections hold the lens 32 vertically in both directions and transversely toward the front.

In addition, the lens 32 is blocked longitudinally in both directions by clamping the projections 104 against a curved front face 35 of the lens 32.

The two wings 96, 98 are in contact with the end cap 20, which makes it possible for the bracket 34 to perform the function of radiator, just as in the first embodiment.

Further, since the bracket 34 is arranged against two faces of the end cap 20, the heat-exchanging fluid also enters into contact with it, making possible its cooling.

Moreover, since the bracket 34 is fastened onto the end cap 20, which belongs to the non-emissive portion of the lamp 16, no shadow area is created by the presence of the bracket 34.

Thus, the heating module 10 that is made according to any one of the embodiments of the invention makes it possible to take advantage of the entire radiation for the heating of the preforms 12 without creating shadow areas.

The fastening of the lens 32 onto the lamp is completely secure because it is performed on non-emissive portions that do not exhibit rotational symmetry around a longitudinal axis.

The brackets 34 also make it possible to perform a function of radiator that facilitates the cooling of the end caps 20.

Further, the fastening of the brackets 34 on the non-emissive portions of the lamp 16 makes it possible not to have to modify the structure of the reflectors 26 and of the unit 28 carrying them.

Thus, the heating module 10 that is made according to any one of the embodiments of the invention makes it possible to take advantage of the entire radiation for the heating of the preforms 12 without creating shadow areas.

The fastening of the lens 32 onto the lamp is completely secure because it is performed on non-emissive portions that do not exhibit rotational symmetry around a longitudinal axis.

The brackets 34 also make it possible to perform a function of radiator that facilitates the cooling of the end caps 20.

Further, the fastening of the brackets 34 on the non-emissive portions of the lamp 16 makes it possible not to have to modify the structure of the reflectors 26 and of the unit 28 carrying them.

The invention claimed is:

1. A heating module (10) for a preform (12) of thermoplastic material, comprising:
   at least one lamp (16) comprising a tubular bulb (18) with a longitudinal axis (A), the bulb (18) being sealed at both its longitudinal ends by two crimped parts (18B), the lamp (16) comprising two end caps (20) each fastened to one of the two crimped parts (18B), a tubular section of the bulb between the two crimped parts forming an emissive portion (22) of a heating electromagnetic radiation, and the two crimped parts (18B) and the end caps (20) forming a non-emissive portion (24) that does not emit said heating radiation; and
   at least one longitudinal lens (32) that is fastened to the lamp (16), by means of at least one fastening bracket (34), parallel to the emissive portion (22) to focus the heating radiation toward a selected area of the preform,
   wherein each bracket (34) is fastened onto the lamp (16) only on the non-emissive portion (24) of the lamp, the bracket being structured to slide longitudinally onto a complementary shape of the end caps (20),
   wherein each bracket (34) defines a housing (52) that accommodates the lens (32) by longitudinal sliding of a free longitudinal end of the lens (32).

2. The heating module (10) according to claim 1, further comprising:
   at least one reflector (26) that is arranged at a distance from the emissive portion (22) of the lamp (16), opposite the lens (32).

3. The heating module (10) according to claim 2, wherein the bracket (34) is fastened by clamping on the non-emissive portion (24) of the lamp (16).

4. The heating module (10) according to claim 1, wherein the fastening bracket (34) is fastened by elastic fitting of complementary shapes onto the non-emissive portion (24) of the lamp (16).

5. The heating module (10) according to claim 1, wherein at least one fastening bracket (34) is fastened onto one of the end caps (20).

6. The heating module (10) according to claim 5, wherein the bracket (34) is fastened by longitudinal fitting of a window (94) of the bracket (34) on a free longitudinal end with a complementary shape of the end cap (20).

7. The heating module (10) according to claim 5, wherein the fastening bracket (34) has two jaws (36, 38) that grip the end cap (20) of the lamp (16) to fasten the bracket (34) by clamping on the non-emissive portion (24) of the lamp (16).

8. The heating module (10) according to claim 7, wherein the two jaws (36, 38) define at their interface a housing (52) to hold a free longitudinal end of the lens (32).

9. The heating module (10) according to claim 8, wherein at least one jaw (38) has a longitudinal stop face (50) against a face (29) associated with the end cap (20) to position the bracket (34) longitudinally onto the lamp (16).

10. The heating module (10) according to claim 7, wherein the jaws (36, 38) are fastened together by screwing.

11. The heating module (10) according to claim 1, wherein at least one fastening bracket (34) is fastened onto one of the two crimped parts (18B) of the lamp (16).

12. The heating module (10) according to claim 11, wherein the fastening bracket (34) has a slot (78) provided with a constriction that is fitted elastically onto the crimped part (18B) that is associated with the lamp (16).

13. The heating module (10) according to claim 1, wherein each fastening bracket is formed of a heat-conducting material to operate as a radiator for the non-emissive portions (24).

* * * * *